UNITED STATES PATENT OFFICE.

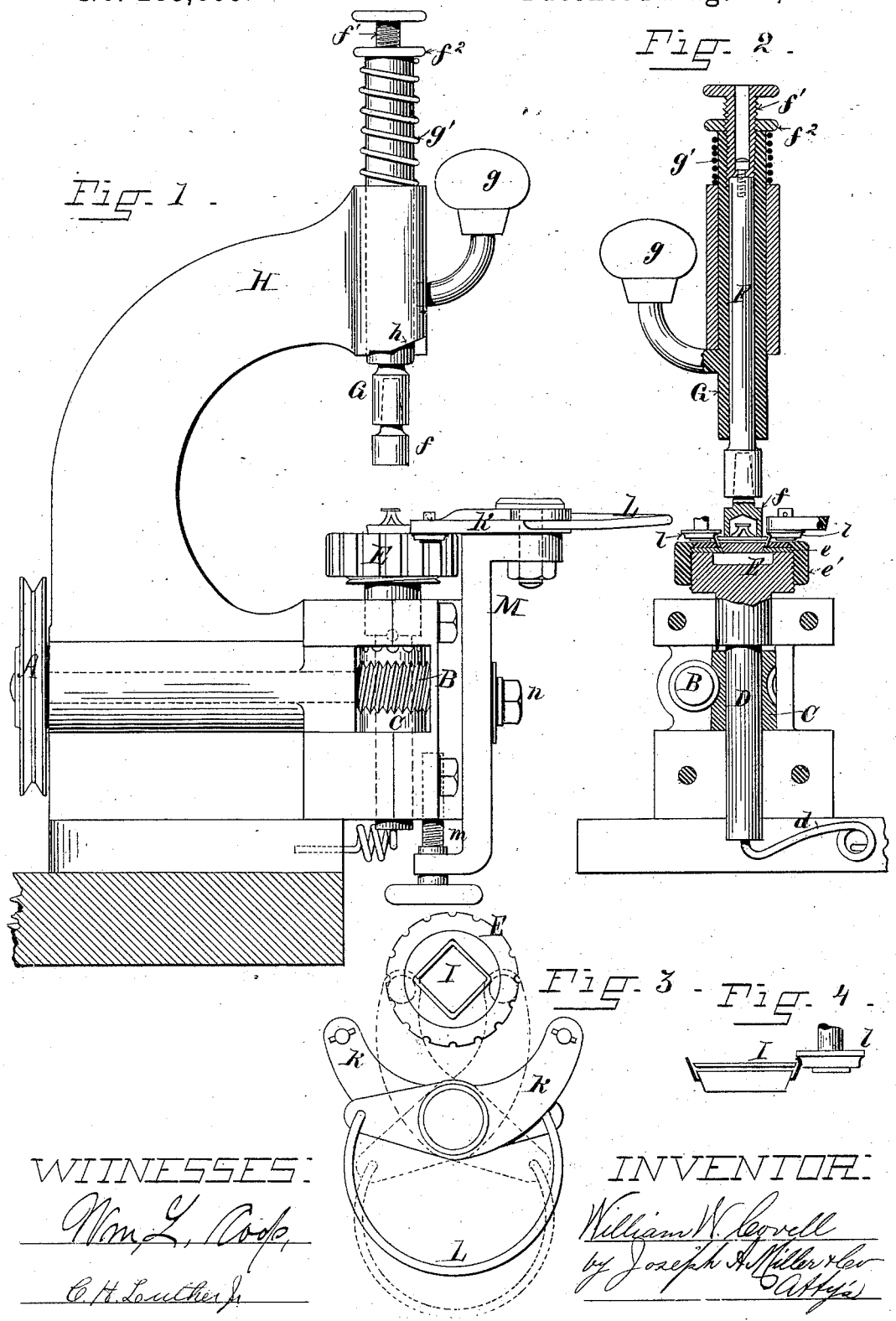

WILLIAM W. COVELL, OF PROVIDENCE, RHODE ISLAND, ASSIGNOR TO FREDERICK I. MARCY, OF SAME PLACE.

JEWELER'S BURNISHING-MACHINE.

SPECIFICATION forming part of Letters Patent No. 283,865, dated August 28, 1883.

Application filed January 2, 1883. (No model.)

*To all whom it may concern:*

Be it known that I, WILLIAM W. COVELL, of the city and county of Providence, and State of Rhode Island, have invented a new and useful Improvement in Jewelers' Burnishing-Machines; and I hereby declare the following to be a full, clear, and exact description of the same, reference being had to the accompanying drawings, forming part of this specification.

This invention has reference to an improvement in machines for burnishing or bending the frames of buttons, pins, and other articles of jewelry over the back plate, so as to secure the stone, glass, plate, or other article inclosed in the frame.

The invention consists in the peculiar and novel construction of the machine, as will be more fully set forth hereinafter, and pointed out in the claims.

Figure 1 is a view of my improved burnishing-machine. Fig. 2 is a sectional view, showing the holder and the follower by which the work is secured, and the burnishers in contact with the work. Fig. 3 is a top view of the holder and the pivoted arms carrying the burnishers. Fig. 4 is a sectional view of a frame, having a stone or jewel and a back plate placed within the frame in contact with a burnisher.

In the art of manufacturing jewelry—that class of jewelry in which a stone, a cameo, or other article is secured in a frame—a back plate is usually placed on the stone or cameo and the edge of the frame is bent over the same, by means of a burnishing-tool, by hand. Skilled labor is required to perform this operation successfully. To facilitate the same and enable unskilled and cheap help to produce good work is the object of this invention.

In the drawings, A is a band-wheel, to which, by means of a band, motion is imparted. This band-wheel A is secured to a shaft on which the worm B is secured, which gears into the sleeve C, which has a worm-gear formed on its periphery, so that constant rotary motion is thereby imparted to the sleeve C. The sleeve C is provided at its upper end with any suitable clutch arrangement—such as a friction, ratchet, or any of the clutch devices that are now known in the arts—by which two parts of a machine may be readily connected or disconnected.

In the drawings a number of concave depressions are shown as formed in the upper end of the sleeve C, into which a projection may enter, so as to connect with the sleeve; but I do not wish to confine myself to this particular clutch device.

D is a spindle, supported in suitable bearings and resting on the spring $d$, which forms the step of the spindle D. The object of this spring-step is to raise the spindle, so as to be free from the clutch on the sleeve C. In place of the spring $d$, a coiled spring may be placed under a step-bearing, so as to support the spindle, or any other convenient device used to support the spindle above the clutch. The upper part of the spindle is enlarged to form the holder E, which is provided with a cavity to receive any projection of the button, pin, or other jewel, and has a screw-thread formed, on which the clamp $e'$ can be screwed to hold the plate $e$ securely in place. This plate $e$ has an opening made in it, into which the jewel of the button, pin, or other article enters, so that its center is on a line with the axis of the spindle D. The frame resting on the plate $e$ is also supported by the clamp $e'$, in which an opening is formed corresponding with the shape of the frame.

F is a spindle supported so as to freely revolve in the sleeve G. It is provided at its lower end with a socket, in which the follower $f$ is secured, which bears on the piece of jewelry to be operated upon. The spindle is adjusted by means of the screw-thread $f'$ at its upper end and the clamp-nut $f^2$. The sleeve G is provided with the arm $g$, and has the coiled spring $g'$ surrounding it at its upper end, so as to retain it in the position shown in Fig. 1. The standard H, in which the sleeve G is supported, has a vertical slot, in which the arm $g$ can slide vertically, the lower end forming the cam $h$, under which the arm $g$ is placed when the sleeve G and spindle F are depressed to hold the work I.

K K are two pivoted arms, one end of each of which is connected with the spring-handle L, made so as to hold the pivoted arms in the position shown in Fig. 3 in solid lines, and to yield to the strain exerted by the hand of the operative, so as to close over the work, as is shown in broken lines in the same figure. The other ends of the arms K K are provided with the burnishing-disks l l.

The operation of the machine is as follows: A piece of jewelry, I, fitting the openings in the plate e and clamp e', that may be in the machine at the time, (clamps and plates to suit various forms and sizes being used in the same machine,) is inserted in the holder. The spindle F is now forced against the work, as is shown in Fig. 2, by depressing the sleeve G with the arm g until it rests under the cam h, the spindle F being adjusted so that when the arm g is under the cam h the spindle D will be connected with the sleeve C by means of the clutch, and rotate with the same. The operative now draws out the spring-handle L and brings the burnisher-disks l l to bear against the sides of the frame, bending the edge over the rear plate, as is shown in Figs. 2 and 4, thus burnishing the edge over the rear plate while the work revolves.

To adjust the burnishers to the proper place with reference to the depth of the frame, the arms K K, carrying the burnishers l l, are pivoted to the adjustable bracket M, having the adjusting-screw m at its lower end, and the clamp-screw n, extending through a slot in the bracket M on the face of the machine.

Sleeve-buttons, scarf-pins, breastpins, earrings, and other articles of jewelry in which a frame is used to hold cameos, jewels, stones, or other ornaments can be quickly, cheaply, and most perfectly secured in this machine by ordinary cheap labor.

It will be seen that the spindle D, with the work-holder E, revolves only so long as the same is pressed down by the spindle F in contact with the driven sleeve C. As soon, therefore, as the arm g is turned and rises in the slot in the standard H, the spindle and work-holder cease to revolve, being lifted off from the sleeve C by the spring d, or an equivalent device. By this arrangement the work-holder E, the work I, and the follower f will always occupy their relative positions, which is of great importance in all forms of jewelry not exactly circular, for the follower should be of nearly the size and shape of the work, and when this is square or oval a change in the relative position of the parts would ruin the work or make the machine inoperative.

Having thus described my invention, I claim as new and desire to secure by Letters Patent—

1. The combination, with a yielding spindle provided with a work-holder and a revolving follower to hold the work in place, constructed to be rotated as described, of the pivoted arms K K, provided with burnishers, and constructed to be forced against the work to burnish the rear edge of the frame, as described.

2. The combination, with the yielding spindle D, provided with the holder E and the follower-spindle f, of mechanism, substantially as described, for rotating the work, and burnishers constructed to bear against the edge of the frame, as described.

3. The combination, with the band-wheel A and worm B, of the sleeve C, provided with a clutch, the spindle D, constructed to be connected with and disconnected from the sleeve C, the holder E, and spindle F, provided with the follower f and operated by the arm g, as and for the purpose described.

4. The combination, in a burnishing-machine, with the spindle D and holder E, of the interchangeable plate e and clamp e', constructed to hold the work to be burnished, as described.

5. The combination, with the revolving holder E, of the spindle F, provided with the adjusting-screw f', and the sleeve G, provided with the arm g, constructed to bring the follower onto the work and hold the same, as described.

6. The combination, in a burnishing-machine, with a revolving work-holder, substantially as described, of the pivoted arms K K, provided with the burnishers l l, and operated by means of the spring-handle L, as and for the purpose described.

7. The combination, in a burnishing-machine, with a revolving work-holder, substantially as described, and the pivoted arms K K, carrying the burnishers, of the bracket M, constructed to adjust the burnishers to the work, as described.

8. In a jeweler's burnishing-machine, the combination of the following instrumentalities: a revolving sleeve, a yielding work-holder, a revolving follower, constructed to hold the work and connect the holder with the revolving sleeve, and a pair of burnishers, constructed to bend over and burnish the rear of the frame, as described.

W. W. COVELL.

Witnesses:
JOSEPH A. MILLER,
M. F. BLIGH.